US008655336B1

(12) United States Patent  
Dempski et al.

(10) Patent No.: US 8,655,336 B1  
(45) Date of Patent: Feb. 18, 2014

(54) REMOTE ISSUE LOGGING AND REPORTING OF MOBILE STATION ISSUES AND DIAGNOSTIC INFORMATION TO MANUFACTURER

(75) Inventors: David Dempski, Washington, NJ (US); Jesus Ramos, Easton, PA (US)

(73) Assignee: Cellco Partnership, Basking Ridge, NJ (US)

( * ) Notice: Subject to any disclaimer, the term of this patent is extended or adjusted under 35 U.S.C. 154(b) by 125 days.

(21) Appl. No.: 13/248,621

(22) Filed: Sep. 29, 2011

(51) Int. Cl.
*H04M 3/00* (2006.01)

(52) U.S. Cl.
USPC ........... 455/418; 455/419; 455/420; 455/423; 455/424; 455/425; 370/310.2; 714/1; 714/2; 714/3; 714/25; 714/47.3; 714/48; 709/224

(58) Field of Classification Search
USPC ............... 455/418–420, 423–425; 370/310.2; 714/1–4.4, 25, 47.3, 48; 709/224
See application file for complete search history.

(56) References Cited

U.S. PATENT DOCUMENTS

| | | | |
|---|---|---|---|
| 6,026,500 A * | 2/2000 | Topff et al. ........................ 714/26 |
| 6,765,593 B2 * | 7/2004 | Simmons ........................ 715/763 |
| 7,210,625 B2 * | 5/2007 | McNutt et al. ................. 235/385 |
| 7,886,189 B2 * | 2/2011 | Mori et al. ........................ 714/25 |
| 8,204,498 B1 * | 6/2012 | Smith et al. ..................... 455/425 |
| 2002/0006791 A1 * | 1/2002 | Nyholm ........................ 455/423 |
| 2005/0266804 A1 * | 12/2005 | Constabileo et al. ........ 455/67.11 |
| 2006/0211415 A1 * | 9/2006 | Cassett et al. ................. 455/423 |

* cited by examiner

*Primary Examiner* — Steve D Agosta

(57) ABSTRACT

A user of a mobile station can report a mobile station issue by transmitting a report including a description of the mobile station issue and other information for rapid troubleshooting and resolution by a manufacturer, through a wireless mobile communication network, to the manufacturer of the mobile station or mobile software, via a life cycle management tool program at a network. The report sent by the user of the mobile station may include information relating to the description of the mobile station issue, mobile station device information, device operation information, diagnostic logs, or captured screenshots. The life cycle management tool program stores the report including the information and sends an electronic notification to a technical center of a carrier and/or the manufacturer of the mobile station or mobile software for review and resolution of the reported mobile station issue in real time.

20 Claims, 6 Drawing Sheets

REMOTE ISSUE LOGGING AND REPORTING OF MOBILE STATION ISSUES AND DIAGNOSTIC INFORMATION TO MANUFACTURER

TECHNICAL FIELD

The present subject matter relates to techniques and equipment to remotely report a mobile station issue from a mobile station to a network, through wireless mobile communications, and make information so obtained accessible by original equipment and/or software manufacturers for faster review and resolution of the mobile station issue.

BACKGROUND

In recent years, mobile communication services have expanded and increased in popularity around the world. Many advanced networks offer wireless mobile communication services for voice calls, mobile messaging services (e.g. text and/or multimedia), and data communications. The data communication services, for example, enable surfing the world wide web, e.g., via a browser on mobile stations. As various value-added services are made available to mobile station users, more and more applications are installed and used on mobile stations causing sometimes mobile station (or device) issues.

As technologies have improved over the years, the features and functionalities supported in mobile stations have increased in number and complexity. This has also increased the varieties and complexities of troubles or issues that users may experience with their mobile stations.

When a user of a mobile station runs into a mobile station issue, the user often returns the mobile station at a retail store for device-check up, or the user calls a customer care representative of a carrier or service provider to report the mobile station issue for resolution. When the mobile station issue is reported at the retail store, information relating to the mobile station issue is at best collected by a representative at the retail store. The representative generally finds out what the mobile station issue is by talking to the user. Using a client terminal, the representative then remotely logs onto a technical support system of the carrier and manually enters the information about the issue into an issue tracking and management system (or a life cycle management tool) located at the carrier's (or service provider's) network for later review and resolution by a manufacturer of the mobile station or its software. Alternately, when the user of the mobile station calls and reports a mobile station issue to a customer care representative over the phone, the customer care representative collects the information as best as possible and manually enters the collected information relating to the reported issue into the issue tracking and management system for later review and resolution by a manufacturer of the mobile station or its software.

In both cases, data about the mobile station issue is collected from the user of the mobile station and manually entered into the issue tracking and management system by the retail store or customer care representative. However, the manufacturer (original equipment manufacturer or software manufacturer) often requires more than the information collected and provided by the retail store or customer care representative, for review and resolution of the reported mobile station issue.

In addition, there are often delays and a passage of time between the report of the mobile station issue and actual review of the reported mobile station issue by the manufacturer, because certain device operation information and logs are not collected and provided by the retail store or customer care representative. These delays and passage of time thus often hamper efforts of the manufacturer in troubleshooting and resolving reported mobile station issues in a timely manner, because after a few days, some diagnostic logs and information are lost or overwritten and thus become unavailable to the manufacturer for debugging purposes.

Further, some mobile diagnostic software, techniques of collecting information on a mobile station, and techniques of wireless transmission of the collected information from the mobile station to a network are known. However, a technique for integrating all needed elements in a seamless manner, from the mobile station to the manufacturer of the mobile station or its software, does not exist. That is, there is no end-to-end mechanism to facilitate rapid review and resolution of a mobile station issue by the manufacturer.

Hence, there is still a need for an improved or simplified technique for facilitating rapid review and resolution of mobile station issues by a manufacturer of mobile stations or its software.

SUMMARY

The teachings herein alleviate one or more of the above noted problems with reporting of a mobile station issue and other needed information by providing a seamless end-to-end mechanism between a user of a mobile station and a manufacturer (e.g., an original equipment manufacturer of the mobile station, or its software manufacturer) to facilitate rapid review and resolution of the mobile station issue.

In a disclosed example, a system for reporting an issue that has occurred on a mobile station configured for communication through a mobile communication network includes an issue report application as well as application programming interfaces (APIs) for enabling the issue report application to communicate with at least one hardware or software component in the mobile station. A processor of the mobile station executes the issue report application, which configures the mobile station to perform functions of providing a user interface to allow a user to input a description of the mobile station issue and to initiate a report; automatically collecting, via one or more of the APIs, information regarding conditions of at least one hardware or software component in the mobile station at about a time of the occurrence of the issue; and responsive to the user initiation, transmitting the report including the description of the mobile station issue and the collected information, through the mobile communication network. The system also includes a computer system coupled to the mobile communication network, a storage device accessible by a processor of the computer system, and a life cycle management tool program stored in the storage device. The life cycle management tool program configures the computer system to perform functions to receive the transmitted report from the mobile station, store data or information including the description of the mobile station issue and the collected information from the received report, and send an electronic notification regarding the occurrence of the issue to a technical center of a carrier and/or a system of a technician of a manufacturer responsible for at least one hardware or software component of the mobile station involved in the mobile station issue. The computer system also provides communications with the system of the technician to allow the technician online access to the stored description of the mobile station issue and the stored collected information, in real-time.

In another example, a method is disclosed for reporting an issue that has occurred on a mobile station configured for communication through a mobile communication network. A user interface is provided to allow a user of the mobile station to input a description of the mobile station issue and to initiate a report. Information is automatically collected via one or more of the APIs, regarding conditions of at least one hardware or software component in the mobile station at about a time of the occurrence of the issue. Responsive to a user input, a report is transmitted over the mobile communication network. The report includes the description of the mobile station issue inputted by the user and the automatically collected information via APIs on the mobile station. The report is transmitted from the mobile station via the mobile communication network to a life cycle management tool, in which the description of the mobile station issue and the collected information are stored. Then, an electronic notification regarding the occurrence of the mobile station issue is generated and sent to a technical center of a carrier and/or a system of a technician of a manufacturer responsible for at least one component of the mobile station involved in the mobile station issue, such as a manufacturer of the mobile station or its software. The method further provides communications with the system of the technician, to allow the technician online access to the stored description of the mobile station issue and the collected information, in real time, e.g., for troubleshooting and root cause analysis of the reported mobile station issue.

Thus, the disclosed technique herein provides a seamless end-to-end mechanism for reporting mobile station issues and facilitating rapid review and resolution thereof by a manufacturer. As a result, the manufacturer can investigate the reported mobile station issue in near real time, thereby increasing overall process efficiency, likelihood of resolution of the issue, and customer satisfaction. In the disclosed technique, the manufacturer can be an original equipment manufacturer of mobile stations or its software manufacturer or vendor.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1:
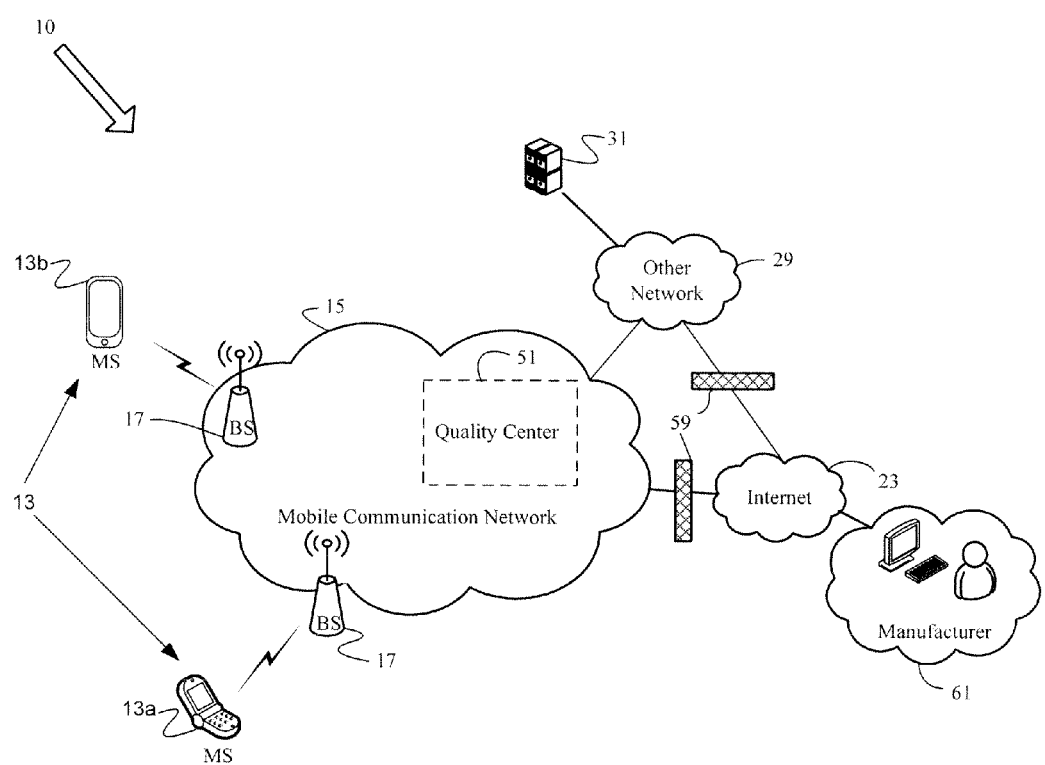
FIG. 1 is a high-level functional block diagram of an exemplary system of networks/devices that provide various communications for mobile stations and support an exemplary technique for reporting mobile station issues from mobile stations for rapid review and resolution of the reported mobile station issues in real time.

FIG. 1 illustrates a system 10 offering a variety of mobile communication services, including wireless communications for users of mobile stations 13. For the purposes of simplicity, the example illustrates only two mobile stations (MSs) 13a and 13b and a few other networks and network elements. The mobile stations 13a and 13b are examples of mobile devices that may be used for various voice communications, data communications, and mobile messaging services. The mobile communication network 15 provides wireless communications services to those mobile stations as well as to other mobile stations (not shown), for example, via a number of base stations (BSs) 17. The present techniques may be implemented in any of a variety of available mobile communication networks 15 and/or on any type of mobile stations compatible with such a mobile communication network 15.

In the example, the mobile communication network 15 might be implemented as a network conforming to the code division multiple access (CDMA) type standard, the 3rd Generation Partnership Project 2 (3GPP2) wireless standard, the Evolution Data Optimized (EVDO) standard, Long Term Evolution (LTE) standard, or other telecommunications standards used for public mobile wireless communications. The mobile stations 13a and 13b are capable of conventional voice telephone, data communications, and other value-added services including multimedia services.

The mobile stations 13a and 13b can take the form of portable handsets, smart-phones or personal digital assistants, tablet devices or the like, although they may be implemented in other form factors. In the example, the mobile station 13a is a non-touch type mobile station, and the mobile station 13b is a touch screen type mobile station. The mobile stations 13a and 13b execute various stored mobile applications (or mobile software) on the devices. An application running on a mobile station 13a or 13b may be configured to execute on many different types of the mobile stations. For example, a mobile application can be written to execute on a binary runtime environment for a BREW-based mobile station, a Windows Mobile based mobile station, an Android, iOS for iPhone or iPad, Java Mobile, or RIM based mobile station operating system, or the like. Some of these types of mobile stations can employ a multi-tasking operating system as well.

The mobile communication network 15 can be implemented by a number of interconnected networks. Hence, the mobile communication network 15 may include a number of radio access networks (RANs), for example including base stations 17, as well as regional ground networks interconnecting a number of RANs and a wide area network (WAN) interconnecting the regional ground networks to core network elements.

It will be understood that the various network elements can communicate with each other and other elements of the mobile communication network as well as with other networks, e.g., the public switched telephone network (PSTN), other mobile networks, any private networks, such as 29 operated by the carrier, and the Internet 23, either directly or indirectly.

The carrier will also operate a number of systems that provide ancillary functions in support of the mobile communications services and/or application services provided through the system 10, and those elements communicate with other nodes or elements of the system 10 via one or more private Internet Protocol (IP) type packet data networks 29 (sometimes referred to as an Intranet), i.e., a private network. Generally, such ancillary systems are part of or connected for communication via the private network 29. A person skilled in the art, however, would recognize that systems outside of the private network could serve the same functions as well. Examples of such systems, in this case operated by the carrier (or network service provider) as part of the overall network 10, which communicate through the intranet type network 29, include one or more application servers 31.

In the example, the system 10 includes a quality center 51 which is described in detail below. The quality center 51 comprises one or more servers (not shown) equipped with testing and defect tracking and management software. Generally, the quality center 51 is set up for quality assurance purposes and product life cycle management, such as, in the example, mobile station life cycle management, which covers different phases of mobile station and its application software testing. For example, the quality center 51 is involved in mobile software releases, specifying requirements, planning tests, executing tests, tracking defects and analyzing results, etc. Often, the quality center 51 also serves as a central repository for organizing and managing the different phases of mobile station (including mobile application software) testing process.

In the example, the quality center 51 includes a "life cycle management tool" which is implemented by one or more servers equipped with a life cycle management tool software or program. It is noted that although the quality center 51 may include various other elements, for the discussion purposes, the quality center 51 will refer to a server equipped with appropriate life cycle management tool software (a "life cycle management tool (LCMT)"). Also, the quality center 51 can be implemented in various forms (e.g., a centralized vs distributed system) and can be located outside the network 15 as part of the carrier's private network 29 (e.g., on a server similar to 31). Alternately, the quality center 51 can be implemented by a third party via the Internet 23.

As shown in FIG. 1, the system 10 further includes a cloud 61 illustrating a manufacturer in communication with the quality center 51 through a firewall 59 over the Internet 23. The manufacturer 61 includes a system of a technician of a manufacturer of mobile stations 13 or its mobile software. As discussed in detail below, the system of the technician of the manufacturer 61 communicates with the quality center 51 to access information relating to reported mobile station issues for review and resolution in real time.

The exemplary technique for reporting a mobile station issue including device operation information to a life cycle management tool or the quality center 51 involves at least some execution of programming in the mobile stations 13 and at least some execution of programming of the computer(s) of the quality center 51.

Figure 2:
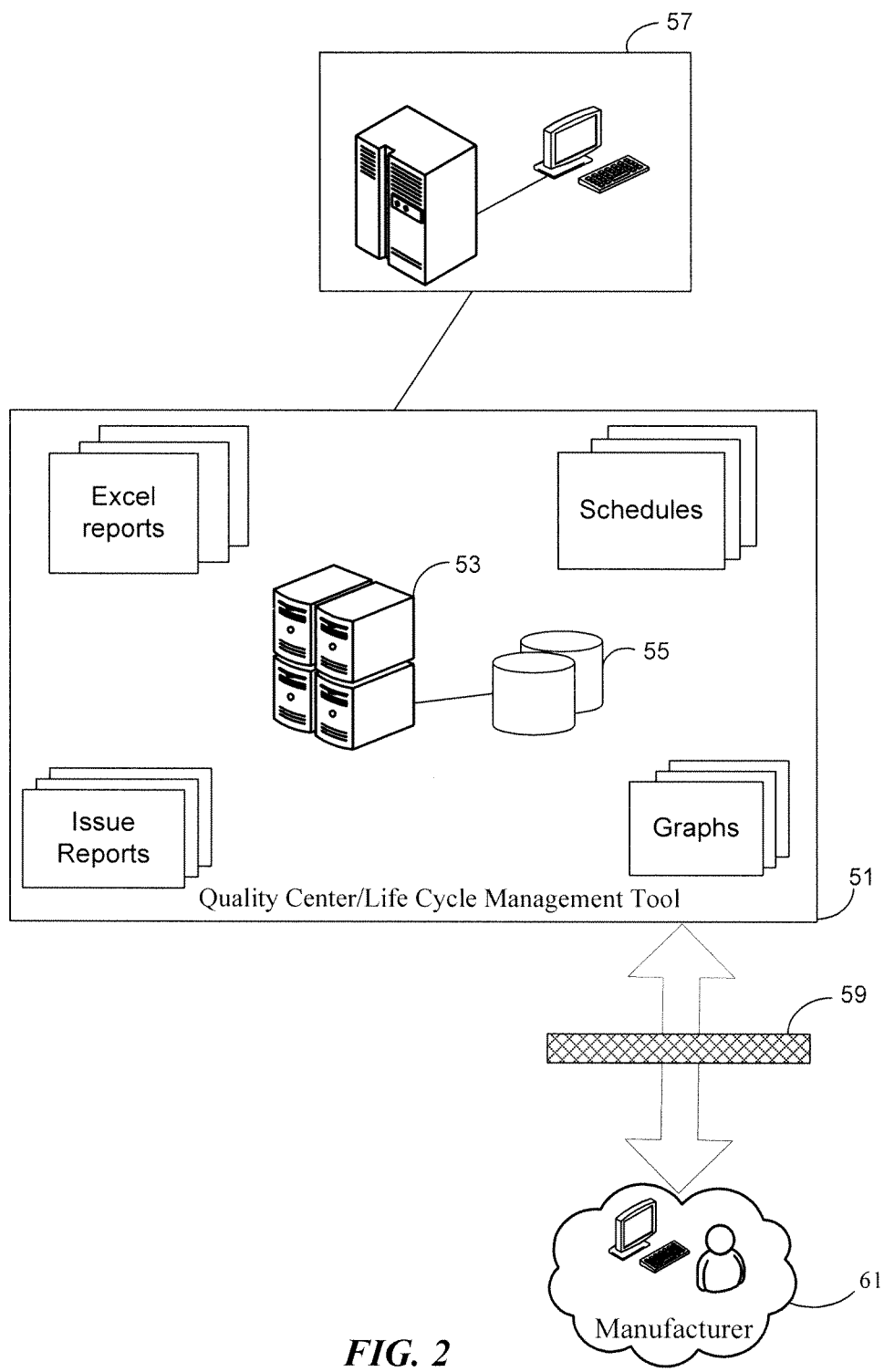
FIG. 2 is a high level exemplary diagram showing in more detail a life cycle management tool (LCMT) and interaction with LCMT.

FIG. 2 illustrates in detail an exemplary implementation of a life cycle management tool (LCMT). As noted earlier, the quality center (or LCMT) 51 can be implemented on a computer system as part of a quality center of the carrier. As such, the LCMT 51 is a carrier customized solution to manage mobile station issues based on third party product (e.g., HP Quality Center product). The LCMT 51 allows the carrier to record, track, manage, and work with diverse manufacturers of mobile stations (e.g., original equipment manufacturers (OEMs)) and mobile application software to resolve various mobile station issues both prior to launch and for commercial customers (i.e., after launch). The LCMT 51 allows personnel of the carrier to submit various problems or issues relating to mobile stations including testing issues, desired enhancements, field issues, etc. via various interfaces including an HTML (or Web-based) interface, desktop client application on a terminal device or the like at a technical center 57. The LCMT 51 includes portals to accept information relating to mobile station issues, such as prelaunch issues from testing personnel, developers, and certification entities; call center reports via the product issue form; commercial customer reports via retail store or customer care representatives; carrier device forums, and the like; and individual customer reports as described in more detail below.

As noted earlier and shown in FIG. 2, The LCMT 51 comprises a server program running on a computer system 53 and a storage device or database(s) 55 connected to the computer system 53. The database(s) 55 serves as a central repository of various issues related to mobile stations for review and resolution by the carrier or manufacturer 61 including the OEMs of the mobile stations, mobile software manufacturers or vendors. For example, in the present disclosure, the mobile station "issues" include software crashes, hardware malfunctions, problems relating to operating system, problems relating to hardware and software compatibilities, etc. The database(s) 55 supports a relational database and contains information on the mobile station issues for access and use in a variety of forms, such as excel reports, issue reports, schedules, graphs, etc. As mentioned above, the information stored in the database(s) 55 includes information entered by customer care representatives, retail stores, internal and/or external software testing personnel, users of mobile stations 13, etc. For review and resolution of reported mobile station issues or device defects, the manufacturer 61 accesses the information stored in the LCMT 51 through a firewall 59 using an authentication protocol, for example, Lightweight Directory Access Protocol (LDAP) via a network. The LDAP is an application protocol for accessing directory structured information over an Internet Protocol (IP) network. Alternately, instead of LDAP over Internet Protocol, other types of protocols, such as transmission control protocol (TCP), user datagram protocol (UDP), and Mobile IPv6 (IP version 6) supporting end-to-end IP connectivity can be used.

As shown in the example of FIG. 2, the information on the mobile station issues stored in the LCMT 51 can be accessed by authorized staff of a technical center 57. The technical center 57 is one of the carrier's technical support facilities providing traditional technical service including review of various reported mobile station issues, troubleshooting the issues, design and provision of temporary solutions, and provision (or implementation) of solutions provided by outside technical personnel (e.g., by an original equipment manufacturer of the mobile station, its software manufacturer, or vendor, etc.). The authorized staff of the technical center 57 may review a reported mobile station issue for quick resolution. That is, when the reported mobile station issue is one of the known problems with solutions (can be found in a knowledge base of the technical center 57) or the reported mobile station issue can be easily resolved, then the staff (or a support person or technician) of the technical center 57 provides a solution for the reported mobile station issue. However, when the staff of the technical center 57 cannot solve the reported mobile station issue, then the staff of the technical center 57 provides the LCMT 51 with an indication that the reported mobile station issue cannot be resolved by the staff of the technical center 57. The LCMT 51 then generates an electronic notification to the manufacturer 61 for prompt review and resolution of the reported mobile station issue. The timing of the electronic notification may be preset by the LCMT 51 and may be changed by an operator from time to time, in accordance with quality center policy and/or agreement with the manufacturer 61, which is described in detail below.

Figure 3:
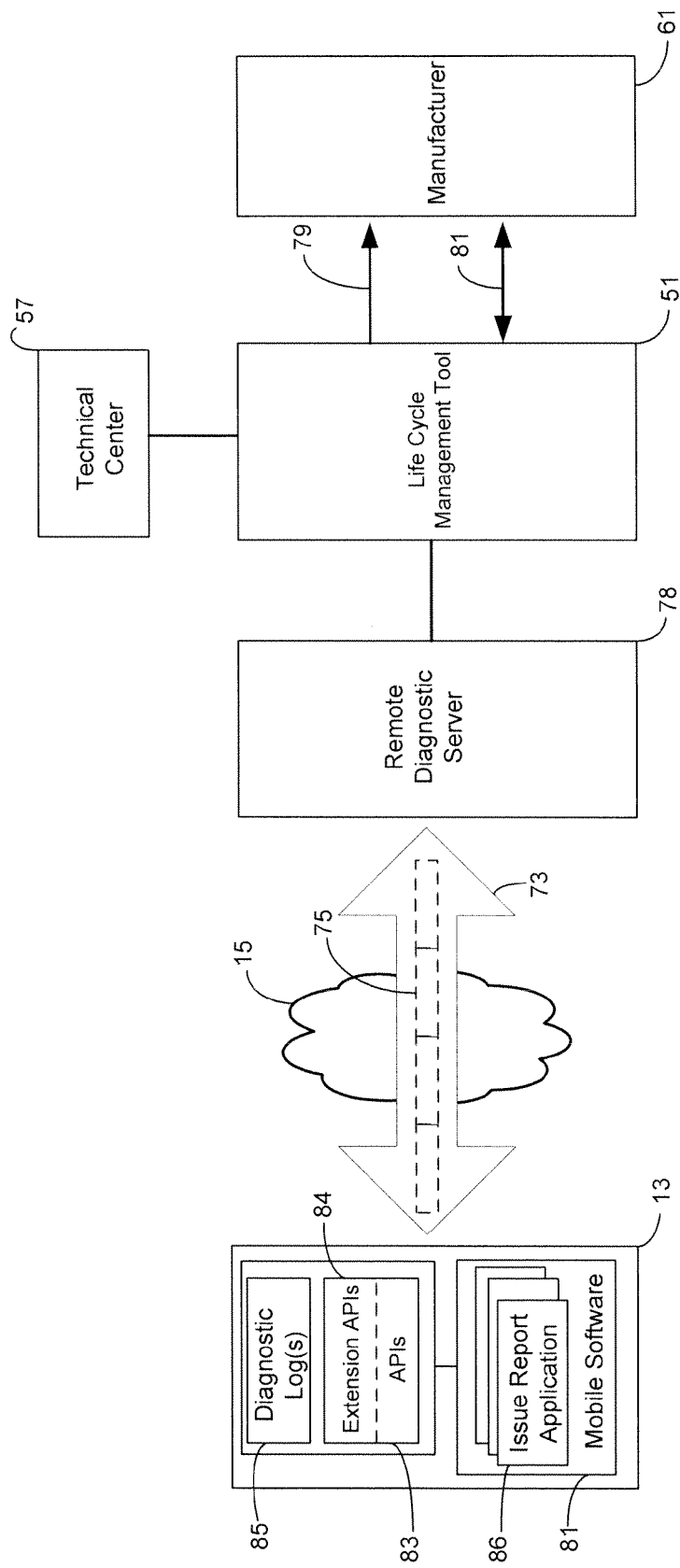
FIG. 3 is a high-level exemplary implementation of the disclosed technique for reporting a mobile station issue and other information from a mobile station over a mobile communication network.

FIG. 3 illustrates an exemplary technique for reporting a mobile station issue and diagnostics information from a mobile station to a manufacturer of the mobile station or its software, via a mobile communication network and a life cycle management tool (LCMT), for real or near real time review by technical personnel of the manufacturer(s).

In the example, the mobile stations 13 (13a and 13b) can take the form of portable handsets, smartphones or personal digital assistants, tablet computers, or the like, although they may be implemented in other form factors. Program applications, including an issue report application 86 for collecting and reporting information relating to mobile station issues, such as mobile station device information, device operation information, and diagnostic logs can be configured to execute on many different types of the mobile stations 13.

As shown in FIG. 3, the mobile station 13 includes an issue report application 86 (as part of mobile software 81), diagnostic log(s) 85, APIs 83, and extension APIs 84. The issue report application 86 is mobile station application software running on the mobile station 13 for reporting a mobile station issue by a user of the mobile station over the mobile communication network 15 to a system of a technician of the manufacturer 16. Detailed descriptions of the issue report application 86 are provided below in reference to FIGS. 4A and 4B. When a mobile station issue occurs on the mobile station 13, a diagnostic log 85 is internally generated, and information relating to the mobile station issue is retrieved or collected via extension APIs 84. That is, via one or more extension APIs 84, information on conditions of one or more hardware or software components of the mobile station 13 can be collected. In the example, the issue report application 86 calls the extension APIs 84 to collect the information, such as mobile device information, device operation information, diagnostic log(s), captured screenshot(s), etc.

As noted above, when the mobile station issue occurs on the mobile station 13, a diagnostic log 85 is created and stored as a log file in a memory of the mobile station for later retrieval. That is, the log file is used to selectively collect information on device specific data and various events that are monitored. For example, the diagnostic log 85 includes debug data, such as trace information, logs of data taken from a radio subsystem, stack dumps, etc. which are often needed for troubleshooting and root cause analysis by the manufacturer 61 (e.g., by the original equipment manufacturer of the mobile station 13, or its mobile software manufacturer).

As mentioned above, the mobile station 13 further includes extension application programming interfaces (APIs) 84. The extension APIs 84 are APIs that are added to the existing APIs 83 in support of implementing the disclosed technique of reporting a mobile station issue. An API is a set of rules and specification that provide for a set of standardized requests that have been defined for a program being called upon. An application uses or invokes various APIs of a mobile operating system running on the mobile station 13 to perform diverse functions and retrieve information relating to hardware and software components of the mobile station (e.g., checking battery level, hardware and software versions, mobile station identification, memory usage, wireless connectivity status, etc.), as well as serving as interfaces between different software programs.

In the example, extension APIs 84 are defined and used to retrieve information relating to a mobile station issue. More specifically, the extension APIs 84 are used to collect at least the following information: mobile station device information, device operation information, diagnostic logs, and captured screenshots. The exemplary mobile station device information includes: manufacturer, model, hardware version, software version, warranty date, mobile station identity information (e.g., Electronic Serial Number (ESN), Mobile Equipment Identifier (MEID), or International Mobile Equipment Identity (IMEI)), etc. The exemplary device operation information includes: installed applications (including name, manufacturer, and version), battery level, signal strength, wireless operating mobile (1X, 3G, 4G, etc.), wireless network system identification (e.g., home, roaming, system identification (SID), network identification (NID)), primary roaming list, internal read-only memory (ROM) and random access memory (RAM) usage, external memory usage (e.g., SD cards), wireless connectivity status (e.g., bluetooth status and Wi-Fi status), data throughout speeds information, etc. Further, screenshots can be captured automatically or manually at about a time of the occurrence of the mobile station issue. For example, when the mobile station issue occurs, a screenshot can be captured and saved by pressing a pre-configured key on the mobile station by the user. Alternately, the mobile station can be configured to automatically capture one or more screenshots when a mobile station issue occurs (e.g., when a memory or stack dump occurs).

In the example, the mobile software 81 of the mobile station 13 (13a or 13b) includes a mobile operating system and other software components for enabling mobile communications services and applications. For example, the mobile software 81 includes many different software in support of various services and functions, such as power management, connectivity management (such as WLAN, Bluetooth, WiFi, etc.), security, phone calls, text messages, mobile data, messaging, camera, location, image sensors, etc. Also, other mobile specific application software are incorporated in the mobile software 81 in support of text/multimedia service message application, OTA (over-the-air) data sync, games, mobile radio and TV, etc.

For the purpose of discussion below, it is presumed that a user of a mobile station runs into a crash of a mobile application program while the user is navigating through different menus on the mobile station. Now, the user desires to report the crash and have the carrier or the manufacturer of the user's mobile station to investigate the issue and get a software or hardware fix for the crash of the mobile application program as soon as possible. In such a case, in accord with the disclosed technique, the user can report the mobile station issue (or the mobile application crash) to the carrier or to a manufacturer (or an original equipment manufacturer of the mobile station) for rapid review and resolution, by launching an issue report application 86 that is installed (e.g., preinstalled or downloaded) on the mobile station 13. Thus, using the disclosed technique, the user does not have to stop by at a retail store or call a customer care representative to report the mobile station issue. Rather, the report is made to the carrier and/or the manufacturer of the mobile station or its software manufacturer for review and real-time troubleshooting.

In referring back to FIG. 3, the mobile station 13 includes a set of extension application programming interfaces (APIs) 84 for reporting a mobile station issue over a wireless communication channel 73, to a life cycle management tool (LCMT) 51 via a remote diagnostic server 78. In the example, the report includes a user entered description of the mobile station issue and other collected information relating to the mobile application crash is transmitted, as data 75, over a mobile communication network 15, to the remote diagnostic server 78 that acts as a front end interface to the LCMT 51.

The wireless communication channel 73 (or a wireless remote diagnostic link) can be any wireless data connection established between the mobile station 13 and the remote diagnostic server 78 over the mobile communication network 15. For example, a TCP/IP wireless connection, short messaging service (SMS) connection, multimedia messaging service (MMS) connection, or other wireless connections that are capable of transporting data from the mobile station 13 to the remote diagnostic server 78 can be established for the disclosed technique. Further, the remote diagnostic server 78 can also be implemented by any commercial remote diagnostic system providing remote diagnostic service for technical support, including Aetherpal and LogMe In systems.

The remote diagnostic server 78 presents a server interface to client application programs (e.g., an issue report application 86 on the mobile station) and acts as a front-end to the LCMT 51. The remote diagnostic server 78 on the network receives the wirelessly transmitted report including the description of the mobile station issue, mobile station device information, device operation information, diagnostic log(s), captured screenshot(s), etc. And the received information by the remote diagnostic server 78 is sent to the quality center or life cycle management tool (LCMT) 51 for storing the received information on the mobile station issue. Alternately, the remote diagnostic server 78 can format or transform the received data in an appropriate format for transmission to the LCMT 51 and subsequent storage in a storage device or a database connected to the LCMT 51.

Serving as a central depository of defects and issues relating to mobile stations, the LCMT 51 then automatically stores the received information in its storage or database(s) 55 for tracking, managing, and facilitating review and resolution of the reported mobile station issue, without any input by a human operator. The database(s) 55 contains, among other data, information relating to descriptions of mobile station issues and associated collected information from other mobile stations. Further, in this example, after receiving and storing the information received from the mobile station, the LCMT 51 automatically generates and sends an electronic notification 79 (e.g., via an e-mail, a text message, or the like) to a system of a technician of the manufacturer 61 (e.g., an original equipment manufacturer or its mobile software manufacturer) for review and resolution in real time. In the example, the electronic notification 79 is generated within 30 minutes of receipt of the report of the mobile station issue. Alternately, the LCMT 51 can send an electronic notification to the technical center 57 of a carrier of the mobile communication network informing the technical center 57 that a mobile station issue has been received for review and resolution. Based on the description of the mobile station issue and received information, staff of the technical center 57 attempts to solve the reported mobile station issue in an effort to speed up the resolution of the reported mobile station issue.

The timing of the electronic notification 79 may be preset by the LCMT 51 and may be changed by an operator from time to time, in accordance with quality center policy and/or agreement with the manufacturer 61. For example, electronic notifications 79 may be sent essentially immediately when an issue report (e.g., a report of a mobile station issue) is received, at predetermined times (e.g., every 30 minutes), when a predetermined sufficient number of issues have arisen (for a single manufacturer or for a group of manufacturers), or when sufficient bandwidth (if presently unavailable) becomes available, or a combination of all of these. In another example, certain issues or customers may be given priority and their issues sent to the manufacturer immediately while others are sent to the same or another manufacturer only in batches (temporal or number). In a specific example, issues such as device crashes may prioritized to repair quicker than game application related issues and thus system resources may be allocated in a more timely manner for the former than the latter. Alternately, the electronic notifications can be sent in parallel to both the technical center 57 and the system of the technician of the manufacturer 61.

Further, the LCMT 51 can support generating a report in various types of forms and formats, including URLs, HTML, or XML files, documents or exportable images so that a technician of the manufacturer 61 can remotely access over the Internet the information in the LCMT 51 relating to the reported mobile station issue.

The technical center 57 is one of the network service provider's (or carrier's) technical support facilities providing traditional technical services including review of various reported mobile station issues, troubleshooting the issues, design and provision of temporary solutions, and provision (or implementation) of solutions provided by outside technical personnel (e.g., an original equipment manufacturer of the mobile station, its software manufacturer, or vendor, etc.). In the example discussed, after the information relating to the mobile station issue is received by the LCMT 51, an electronic notification 79 is generated and sent to the manufacturer 61 for review and resolution. However, in another example, the LCMT 51 may generate an electronic notification to the technical center 57 for an initial review of the reported mobile station issue. If the reported mobile station issue cannot be resolved by a support person of the technical center 57, then the LCMT 51 generates and sends an electronic notification to a system of a technician of the manufacturer 61 for review and resolution of the reported mobile station issue in real time. The timing of the electronic notification may be similar to that described above.

After receiving the electronic notification 79 from the LCMT 51, the technician of the manufacturer 61 connects to the LCMT 51 over a secure network link 81 or through a firewall 59 of the carrier using various authentication protocols including the LDAP protocol, for access and review of the reported mobile station issue and associated information including diagnostic logs and captured screenshots. Having access to all the information needed for troubleshooting the reported mobile station issue (e.g., the user entered issue description, automatically collected mobile station device information, device operation information, diagnostic logs, and pertinent screenshots) the technician of the manufacturer 61 can now review the reported mobile station issue (e.g., the mobile application crash), investigate, and take appropriate action in real time for resolution of the mobile station issue.

Once a solution is identified, the technician of the manufacturer 61 can submit the solution (via a software patch or revision of code, etc.) to the LCMT 51 for review and implementation by the carrier.

In the example, the staff of the technical center 57 can use various means including the over-the-air (OTA) technology to provide the solution to the reported mobile station issue. For example, the staff of the technical 57 can initiate an OTA update process for providing a software patch to fix the reported mobile application crash; that is, the software patch or update is automatically transferred to the mobile station over the air from a remote server on the network, and applied to the mobile station without any operator intervention. Alternately, if the solution to the reported mobile station issue does not become readily available, the manufacturer 61 can provide to the LCMT 51 time estimate to resolve the reported mobile station issue. In turn, the carrier or staff of the technical center 57 can notify the user of the mobile station of the time estimate to resolve the reported mobile station issue via telephone calls or electronic notifications, such as e-mail, SMS, EMS, and MMS messages.

In another implementation, for additional security, the technician of the manufacturer 61 may be only allowed online access to the information relating to the reported mobile station issue via a duplicate LCMT system within the carrier's network. In this example, the duplicate LCMT system includes a copy of the database 55 and the LCMT 51, and synchronization between the two systems is maintained. For example, the databases are replicated or synchronized at specific, predetermined times, such as every 30 minutes, between the two systems.

Figure 4A:
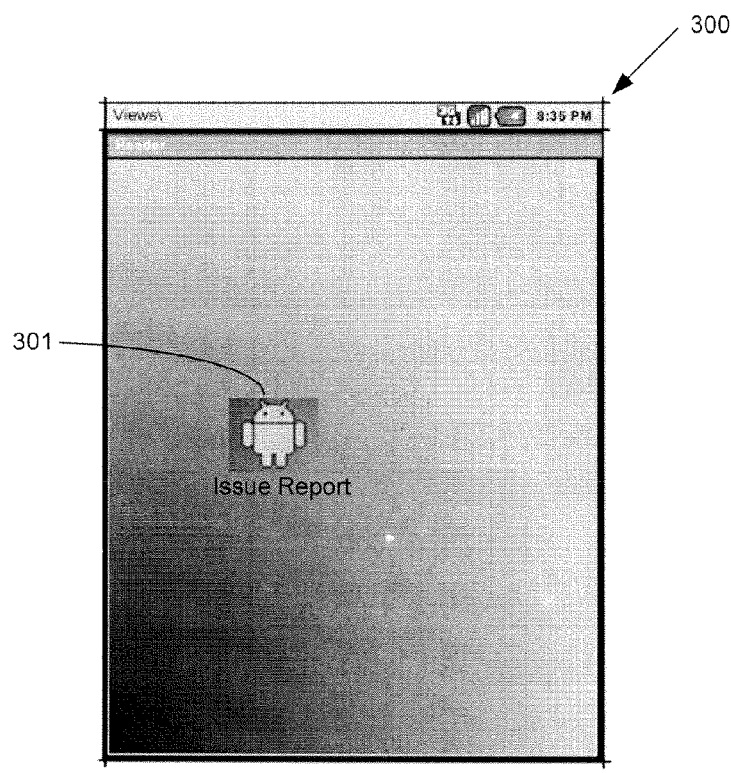
FIGS. 4A and 4B illustrate an exemplary issue report application running on a mobile station for reporting a mobile station issue.
Figure 4B:
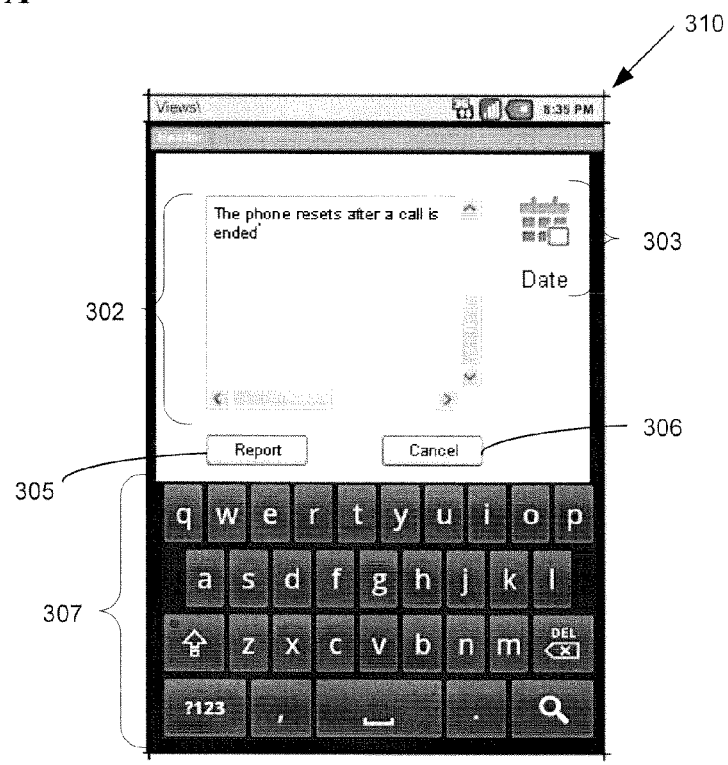

FIGS. 4A and 4B illustrate graphical interfaces 300 and 310 of an exemplary mobile issue report application installed on a mobile station. As shown in FIG. 4A, the home screen 310 of the mobile station (e.g., a touchscreen type mobile station 13b or the like) includes an icon 301 for starting the exemplary issue report application 86 for display to the user. When the user launches the exemplary issue report application 86 (e.g., touches the icon 301), the display presents a graphical user interface 310 enabling the user to enter a description of a mobile station issue, as shown in FIG. 4B.

In the example of FIG. 4B, the graphical interface 310 of the mobile station 13b includes a text window 302, a date icon 303, user selection buttons (a report button 305 and a cancel button 306), and a touch type keypad 307. Using the touch type keypad 307 or the like, the user enters a short description of the mobile station issue (e.g., a mobile application crash) in the text window 302, enters the date and time information of the occurrence of the crash by selecting the date icon 303, and selects any attachments of screenshots (not shown). In other implementations, the user may be prompted to select one or a series of questions to first narrow the issue in order to direct the issue to the appropriate technician. These questions may be modified from time to time as products, manufacturers and issues change (the last due, e.g., to system updates or problems caused by new applications). In other implementations, the issue(s) may be entered verbally by the user and either transformed into text by a corresponding speech-to-text program (which is then able to be confirmed/modified by the user) or the sound file stored for transmission when reporting the issue. By selecting the report button 305, the user causes the mobile station to send information relating to the mobile station issue wirelessly over the mobile communication network 15 to the LCMT 51 for access by a technician using a system of a service provider or a manufacturer of the mobile station. That is, when the user selects the report button 305, a wireless communication channel is established between the mobile station 13 (13a or 13b) and the mobile communication network 15, and the information relating to the mobile application crash is transmitted wirelessly to the life cycle management tool (LCMT) 51 via the remote diagnostic server 78, as shown in FIG. 3. The information relating to the mobile application crash includes the user entered issue description, mobile station device information, screenshots captured, device operation information, diagnostic log(s), etc.

By selecting the cancel button 306, the user can abort reporting of the mobile station issue, and the issue report application saves the collected information including the diagnostic log(s) and captured screenshot(s) in memory for a few days.

Those skilled in the art presumably are familiar with the structure, programming and operations of the various types of mobile stations. However, for completeness, it may be useful to consider the functional elements/aspects of exemplary mobile stations 13a and 13b, at a high-level.

Figure 5:
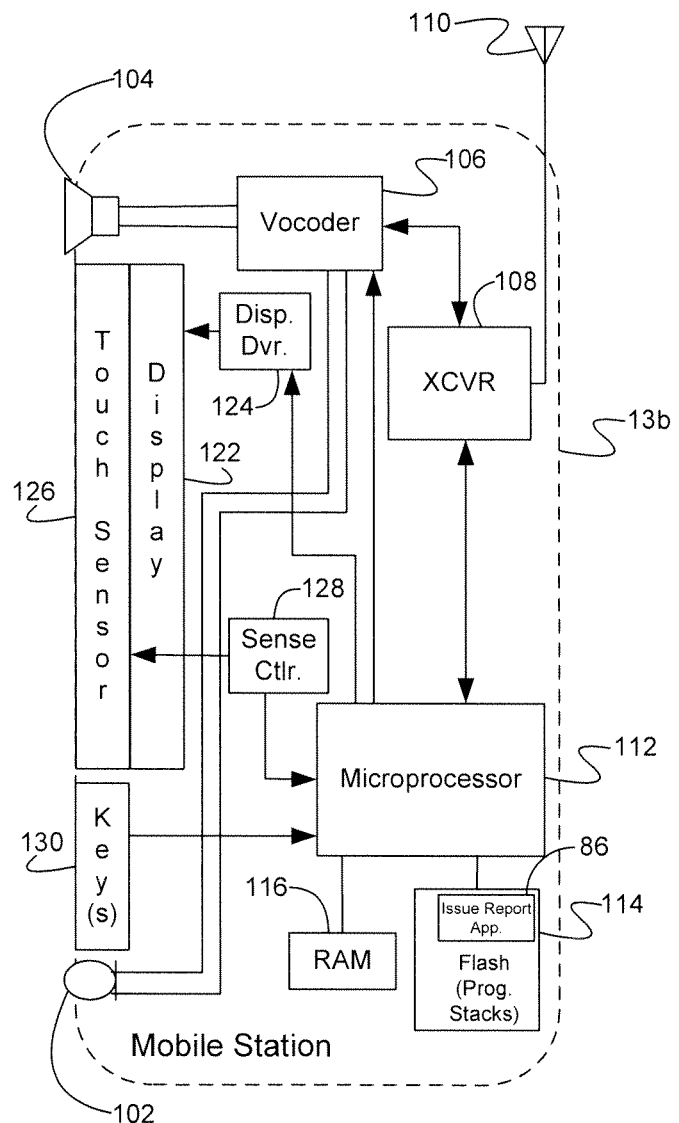
FIG. 5 is a high-level block diagram of an exemplary touchscreen type mobile station used in a network/system like that shown in FIG. 1.

FIG. 5 provides a block diagram illustration of an exemplary touchscreen type mobile station 13b. Although possibly configured somewhat differently, a exemplary non-touch type mobile station 13a includes similar elements of mobile station 13b. Thus, detailed descriptions of the mobile station 13a are omitted. The mobile station 13b may be a smart-phone or may be incorporated into another device, such as a personal digital assistant (PDA), a personal computer (PC), a tablet, or the like, for discussion purposes, the illustration shows the mobile station 13b is in the form of a handset. The handset embodiment of the mobile station 13b includes various components (e.g., hardware and software components) and functions as a normal digital wireless telephone station. For that function, the station 13b includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13b also includes at least one digital transceiver (XCVR) 108. Today, the handset 13b would be configured for digital wireless communications using one or more of the common network technology types including third generation (3G) and fourth generation (4G) technologies. The mobile station 13b may also be capable of analog operation via a legacy network technology.

The transceiver 108 provides two-way wireless communication of information, such as vocoded speech samples and/or digital information, in accordance with the technology of the mobile communication network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver 108 may also support various types of packet switched wireless connections including Transmission Control Protocol (TCP)/Internet Protocol (IP). Also each transceiver 108 supports mobile messaging services, such as short messaging service (SMS), enhanced messaging service (EMS) and/or multimedia messaging service (MMS). The bearer transport resources of the transceiver 108 can support voice communications or can support data communications, or sometimes both at the same time. However, the signaling resources remain available always for a voice call or data communication. For example, the signaling resources are available to tear down air link and network connection at the end of a voice call.

In the example of FIG. 5, the mobile station 13*b* may have a limited number of key 130, but the user interface functions of the display and keypad are implemented via a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13*b* includes a display 122, which the microprocessor 112 controls via a display driver 124, to present visible outputs to the device user. The mobile station 13*b* also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13*b*. The microphone 102 and speaker 104 may be used as additional user interface elements, for audio input and output.

Of course other user interface elements may be used, such as a trackball, as in some types of PDAs or smart phones. In addition to normal telephone and data communication related input/output (including message input and message display functions), the user interface elements also may be used for display of menus and other information to the user and user input of selections.

A microprocessor 112 serves as a programmable controller for the mobile station 13*b*, in that it controls all operations of the mobile station 13*b* in accord with programming that it executes, for all normal operations, and for operations involved in procedures for generating and sending a report of a mobile station issue and device operation information to the manufacturer of the mobile station or mobile software under consideration here. In the example, the mobile station 13*b* includes flash type program memory 114, for storage of various "software" or "firmware" program routines and mobile configuration settings, etc. The mobile station 13*b* may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software, short messaging service software, issue report application software, etc. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112. The programming stored in the flash type program memory includes implementations of various applications including an issue report application for use by a user of a mobile station, and extension APIs for retrieving information from the mobile station.

As outlined above, the mobile station 13*b* includes a processor, and programming stored in the flash memory 114 configures the processor so that the mobile station is capable of performing various desired functions, including in this case the functions involved in the technique for generating, collecting, and transmitting wirelessly to a life cycle management tool of the carrier, information relating to a mobile station issue and other information, such as mobile station device information, device operation information, diagnostic logs, etc. for review and resolution by a manufacturer of the mobile station or its software.

The structure and operation of the mobile station 13*b*, as outlined above, were described to by way of example only.

As discussed above, in addition to functions implemented, by the mobile station 13*b*, some functions relating to reporting mobile station issues to a manufacturer may be implemented on computers connected for data communication via the components of the mobile network or a separate network operating as the server or other system elements as shown in earlier drawings, such as the life cycle management tool 51 or the technical center 57. Although special purpose devices may be used, such devices also may be implemented using one or more hardware platforms intended to represent a general class of data processing device commonly used to run "server" programming such as a remote diagnostic server and/or a life cycle management tool (or server) discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities (or components) involve programming, including executable code as well as associated stored data, e.g., files used for generating, sending over the wireless mobile communication network to the life cycle management tool of the carrier, various information relating to mobile station issues including mobile station device information, device operation information, and diagnostic logs for review and resolution by the manufacturer of a mobile station or its software. Some software code relates to such server or network element functions and is executable by the general-purpose computer. In operation, the server code is stored in a non-transitory storage medium within the general-purpose computer platform. At other times, however, the server software may be stored at other locations and/or transported for loading into the appropriate general-purpose computer system. Similarly, software code for applications or other programming for the mobile stations, including that for collection and report of information (or data) relating to a mobile station issue, may also be stored in a server and transmitted through the network for storage in memories of the mobile stations.

Figure 6:
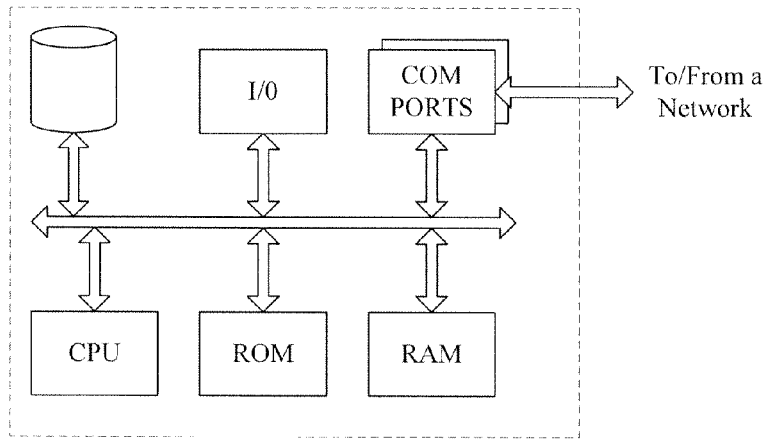
FIG. 6 is a simplified functional block diagram of a computer that may be configured as a host or server, as shown in the system of FIG. 1.
Figure 7:
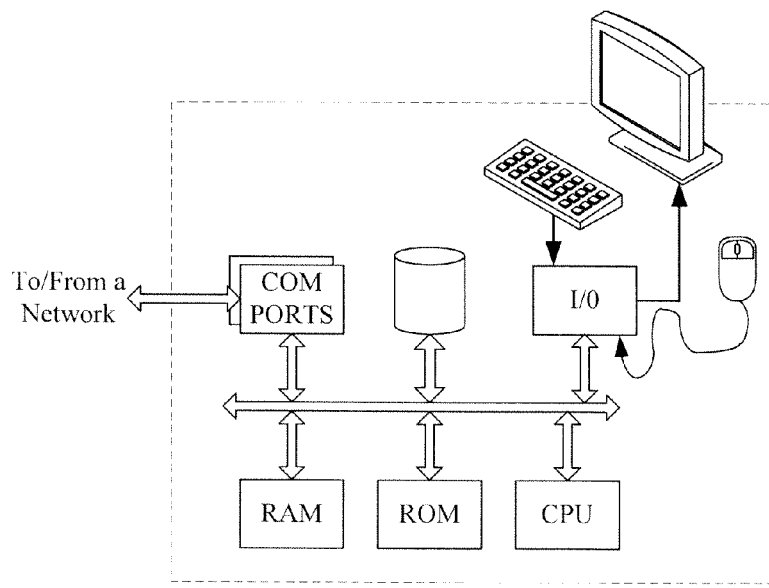
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment, and as a result the drawings should be self-explanatory.

A server, for example, includes a data communication interface for packet data communication. The server also includes a central processing unit (CPU), in the form of one or more processors, for executing program instructions. The server typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

As known in the data processing and communications arts, a user terminal such as a general-purpose personal computer, a remote diagnostic server, a computer system equipped with a life cycle management tool program, or a mobile station typically comprises a central processor or other processing device, an internal communication bus, various types of memory or storage media (e.g., RAM, ROM, EEPROM, cache memory, disk or flash drives for mass storage, etc) for code and data storage, and one or more network or communication interfaces or ports for communication purposes. The software functionalities involve programming, including executable code as well as associated stored data, e.g., files used for user applications, extension APIs, and/or an issue report application. In operation, the code is stored within the mobile device. At other times, however, the software may be stored at other locations and/or transported for loading into an appropriate mobile station system. Execution of such code by a processor of the mobile station enables the mobile station to implement the methodology for reporting an issue that has occurred on the mobile station, over the mobile communication network to a life cycle management tool so that a manufacturer of the mobile station or its software can access data about the mobile station issue in real time, in essentially the manner performed in the implementations discussed and illustrated herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   a memory within a mobile station;
   an issue report application stored within the memory of the mobile station;
   application programming interfaces (APIs) enabling the issue report application to communicate with at least one of a plurality of hardware or software components in the mobile station,
   wherein execution of the issue report application by a processor of the mobile station configures the mobile station to perform functions, including functions to:
   (a) provide a user interface to allow a user to input a description of the mobile station issue and to initiate a report;
   (b) via one or more of the APIs, collect information regarding conditions of at least one of a plurality of hardware or software components in the mobile station at about a time of the occurrence of the issue; and
   (c) responsive to a user input, transmit the report, including the description of the mobile station issue and the collected information, through a mobile communication network;
   a computer system coupled to the mobile communication network and having a processor;

a storage device accessible by the processor of the computer system; and a life cycle management tool program in the storage device, wherein execution of the life cycle management tool program by the processor of the computer system configures the computer system to perform functions, including functions to:
(i) receive the report from the mobile station via the mobile communication network;
(ii) store the description of the mobile station issue and the collected information from the received report;
(iii) send an electronic notification regarding the occurrence of the mobile station issue to staff of a technical center of a carrier of the mobile communication network for review and resolution of the mobile station issue;
(iv) send an electronic notification regarding the occurrence of the mobile station issue to a system of a technician of a manufacturer responsible for at least one of a plurality of hardware or software components of the mobile station involved in the mobile station issue when a resolution to the mobile station issue is not identified by the staff of the technical center; and
(v) provide communications with the system of the technician to allow the technician online access to the stored description of the mobile station issue and the stored collected information in real time.

2. The system of claim 1, wherein the collected information includes: mobile device information, device operation information, or a diagnostic log.

3. The system of claim 2, wherein the collected information includes a captured screenshot.

4. The system of claim 2, wherein the mobile device information includes: manufacturer, model, hardware version, software version, warranty date, or mobile station identification information.

5. The system of claim 2, wherein the device operation information includes: installed mobile applications, battery level, signal strength, wireless operating mode, wireless network system identification, primary roaming list, internal read only memory (ROM) usage and random access memory (RAM) usage, external memory usage, wireless connectivity status, or data throughput speed information.

6. The system of claim 1, wherein the life cycle management tool program stores information including the description of the mobile station issue and the collected information in a database accessed by the computer system, wherein the database contains information relating to descriptions of mobile station issues and associated collected information from other mobile stations.

7. The system of claim 1, further comprising a remote diagnostic server configured to receive the report from the mobile station through the mobile communication network and send information contained in the report to the computer system for processing by the life cycle management tool program.

8. The system of claim 1, wherein:
the life cycle management tool program presets a timing for sending, to the staff of the technical center of the carrier or to the system of the technician of the manufacturer, the electronic notification regarding the occurrence of the mobile station issue.

9. The system of claim 8, wherein the preset timing for sending the electronic notification, to the staff of the technical center of the carrier or to the system of the technician of the manufacturer, is configurable to allow for alternative timelines for sending of the electronic notification.

10. The system of claim 9, wherein the alternative timelines include the electronic notification being sent to the staff of the technical center of the carrier or to the system of the technician of the manufacturer (1) substantially immediately upon the mobile station transmitting the report; (2) at predetermined times; or (3) upon the mobile station transmitting a predetermined number of reports.

11. The system of claim 1, wherein:
the life cycle management tool program (1) prioritizes a plurality of mobile station issues and (2) immediately sends, to the system of the technician of the manufacturer, the electronic notification regarding the occurrence of the mobile station issue identified as having the highest priority.

12. A computer system comprising:
a communication interface configured to support communication of the computer system with a mobile station through a mobile communication network;
a processor coupled to the interface;
a storage device accessible by the processor; and
a life cycle management tool program in the storage device, wherein execution of the life cycle management tool program by the processor of the computer system configures the computer system to perform functions, including functions to:
(a) receive a report from the mobile station via the mobile communication network, the report including a user entered description of a mobile station issue and automatically collected information from the mobile station;
(b) automatically store the description of the mobile station issue and the automatically collected information from the received report;
(c) send an electronic notification regarding the occurrence of the mobile station issue to staff of a technical center of a carrier of the mobile communication network for review and resolution of the mobile station issue;
(d) send an electronic notification regarding the occurrence of the mobile station issue to a system of a technician of a manufacturer responsible for at least one of a plurality of hardware or software components of the mobile station involved in the mobile station issue when a resolution to the mobile station issue is not identified by the staff of the technical center; and
(e) provide communications with the system of the technician to allow the technician online access to the stored report including the description of the mobile station issue and the automatically collected information, in real time,
wherein the automatically collected information includes mobile device information, device operation information, a diagnostic log, and a captured screenshot.

13. The computer system of claim 12, wherein the automatically collected information includes: mobile device information, device operation information, or a diagnostic log.

14. The computer system of claim 13, wherein the automatically collected information includes a captured screenshot.

15. The computer system of claim 13, wherein the device operation information includes: installed mobile applications, battery level, signal strength, wireless operating mode, wireless network system identification, primary roaming list, internal read only memory (ROM) usage and random access memory (RAM) usage, external memory usage, wireless connectivity status, or data throughput speed information.

16. The computer system of claim 12, wherein the life cycle management tool program stores information including the description of the mobile station issue and the collected information in a database accessed by the computer system, wherein the database contains information relating to descriptions of the mobile station issue and associated collected information from other mobile stations.

17. The computer system of claim 12, further comprising a remote diagnostic server configured to receive the report from the mobile station through the mobile communication network and send information contained in the report to the computer system for processing by the life cycle management tool program.

18. A method, comprising:
 coupling a processor to an interface;
 accessing, by the processor, a storage device;
 configuring a life cycle management tool program, in the storage device, to:
  receive, from a mobile station via a mobile communication network, a report including a user entered description of a mobile station issue and automatically collected information from the mobile station;
  automatically store the description of the mobile station issue and the automatically collected information from the received report;
  send, to staff of a technical center of a carrier of the mobile communication network, an electronic notification regarding the occurrence of the mobile station issue for review and resolution of the mobile station issue;
  send, to a system of a technician of a manufacturer responsible for at least one of a plurality of hardware or software components of the mobile station involved in the mobile station issue, an electronic notification regarding the occurrence of the mobile station issue when a resolution to the mobile station issue is not identified by the staff of the technical center; and
  provide communications with the system of the technician to allow the technician online access to the stored report including the description of the mobile station issue and the automatically collected information, in real time,
  wherein the automatically collected information includes mobile device information, device operation information, a diagnostic log, and a captured screenshot.

19. The method of claim 18, further configuring the lifetime management tool program to preset a timing for sending, to the staff of the technical center of the carrier or to the system of the technician of the manufacturer, the electronic notification regarding the occurrence of the mobile station issue.

20. The method of claim 19, wherein the preset timing for sending the electronic notification, to the staff of the technical center of the carrier or to the system of the technician of the manufacturer, is configurable to allow for alternative timelines for sending of the electronic notification.

* * * * *